(12) United States Patent
Nishikawa

(10) Patent No.: US 11,084,280 B2
(45) Date of Patent: Aug. 10, 2021

(54) PRINTER, LEARNING DEVICE, AND LEARNING METHOD

(71) Applicant: SEIKO EPSON CORPORATION, Tokyo (JP)

(72) Inventor: Takayuki Nishikawa, Sapporo (JP)

(73) Assignee: Seiko Epson Corporation, Tokyo (JP)

(*) Notice: Subject to any disclaimer, the term of this patent is extended or adjusted under 35 U.S.C. 154(b) by 69 days.

(21) Appl. No.: 16/583,872

(22) Filed: Sep. 26, 2019

(65) Prior Publication Data

US 2020/0101717 A1 Apr. 2, 2020

(30) Foreign Application Priority Data

Sep. 27, 2018 (JP) .............................. JP2018-181983

(51) Int. Cl.
*B41J 2/045* (2006.01)
*G06N 20/00* (2019.01)
*B41J 2/21* (2006.01)
*B41J 2/165* (2006.01)

(52) U.S. Cl.
CPC ......... *B41J 2/0451* (2013.01); *B41J 2/04536* (2013.01); *B41J 2/165* (2013.01); *B41J 2/2142* (2013.01); *G06N 20/00* (2019.01); *B41J 2/04501* (2013.01); *B41J 2/16579* (2013.01); *B41J 2002/16573* (2013.01)

(58) Field of Classification Search
CPC ...... B41J 2/0451; B41J 2/165; B41J 2/04536; B41J 2/2142; B41J 2/16579; B41J 2/04501; B41J 2002/16573
See application file for complete search history.

(56) References Cited

U.S. PATENT DOCUMENTS

2003/0058299 A1* 3/2003 Endo .................... B41J 2/16579
347/23

FOREIGN PATENT DOCUMENTS

| CN | 107323111 | 11/2017 |
|---|---|---|
| JP | 09-267481 | 10/1997 |
| JP | 2006-297869 | 11/2006 |
| JP | 2015-178178 | 10/2015 |
| JP | 2018-083310 | 5/2018 |

* cited by examiner

*Primary Examiner* — Henok D Legesse
(74) *Attorney, Agent, or Firm* — Workman Nydegger

(57) ABSTRACT

A learning device targeted for a printer including a printer head that discharges ink, the learning device includes: an information obtaining section configured to obtain a parameter that affects ink discharge failures of the print head; an event data obtaining section configured to obtain event data regarding an occurrence state of the ink discharge failures; and a learning section configured to perform machine learning on a prediction condition of an occurrence interval of the ink discharge failures in accordance with a learning data set created based on the parameter and the event data.

9 Claims, 11 Drawing Sheets

PRINTER, LEARNING DEVICE, AND LEARNING METHOD

The present application is based on, and claims priority from JP Application Serial Number 2018-181983, filed Sep. 27, 2018, the disclosure of which is hereby incorporated by reference herein in its entirety.

BACKGROUND

1. Technical Field

The present disclosure relates to a printer, a learning device, and a learning method.

2. Related Art

Performing a maintenance operation of a printer is known to prevent a print head from causing discharge failures nowadays. For example, as the maintenance operation, flushing, which discharges ink from a nozzle, or the like is performed (for example, refer to JP-A-2018-83310). A printer disclosed in JP-A-2018-83310 performs a maintenance operation, such as processing for discharging ink from a print head at each time set in advance, processing for circulating ink, and the like.

SUMMARY

The present disclosure predicts a time interval at which ink discharge failures occur with high precision so as to perform a maintenance operation of a print head at suitable timing in order to prevent ink discharge failures.

According to an aspect of the present disclosure, there is provided a printer including: an information obtaining section configured to obtain a parameter that affects ink discharge failures of a print head that discharges ink; an event data obtaining section configured to obtain event data regarding an occurrence state of the ink discharge failures; and a learning section configured to perform machine learning on a prediction condition of an occurrence interval of the ink discharge failures in accordance with a learning data set created based on a combination of the parameter obtained by the information obtaining section and the event data obtained by the event data obtaining section.

The printer described above may further include a prediction section configured to predict the occurrence interval of the ink discharge failures based on the event data and the prediction condition.

In the printer described above, the learning section may include a reward value calculation section configured to compare the occurrence interval of the ink discharge failures predicted based on the prediction condition with the event data obtained by the event data obtaining section, and may perform reinforcement learning based on a reward determined by the reward value calculation section.

In the printer described above, the event data obtaining section may obtain the event data regarding an actual occurrence of the ink discharge failures in the print head, and the reward value calculation section may determine the reward based on a difference between the occurrence interval of the ink discharge failures predicted based on the prediction condition and an actual occurrence interval of discharge failures indicated by the event data.

The printer described above may further include a maintenance controller configured to determine a maintenance execution timing based on the occurrence interval of the ink discharge failures predicted by the prediction section.

The printer described above may further include the print head, wherein the maintenance controller may perform maintenance of the print head in accordance with the maintenance execution timing.

The printer described above may further include a notification section configured to notify of the maintenance execution timing.

In the printer described above, for the print head including a plurality of nozzles per color of the ink, the prediction section may predict the occurrence interval of the ink discharge failures per nozzle or per nozzle group including a plurality of nozzles, and the maintenance controller may determine the maintenance execution timing per the nozzle or per the nozzle group based on the occurrence interval of the ink discharge failures predicted by the prediction section.

According to an aspect of the present disclosure, there is provided a learning device targeted for a printer including a printer head that discharges ink, the learning device including: an information obtaining section configured to obtain a parameter that affects ink discharge failures of the print head; an event data obtaining section configured to obtain event data regarding an occurrence state of the ink discharge failures; and a learning section configured to perform machine learning on a prediction condition of an occurrence interval of the ink discharge failures in accordance with a learning data set created based on the parameter obtained by the information obtaining section and the event data obtained by the event data obtaining section.

In the learning device described above, the information obtaining section may obtain as the parameter at least any one of color of the ink used by the print head, a consumption amount of the ink per color during the occurrence interval of the ink discharge failures, temperature at use environment of the printer, maintenance information indicating an execution state of maintenance operation of the print head, operation time information regarding operation time of the printer, and ink information regarding the ink used by the print head.

The learning device described above may further include a prediction section configured to predict the occurrence interval of the ink discharge failures based on the event data and the prediction condition.

According to an aspect of the present disclosure, there is provided a method of learning, targeted for a printer including a printer head that discharges ink, the method including: an information obtaining step of obtaining a parameter that affects ink discharge failures of the print head; an event data obtaining step of obtaining event data regarding an occurrence state of the ink discharge failures; and a learning step of performing machine learning on a prediction condition of an occurrence interval of the ink discharge failures in accordance with a learning data set created based on the parameter obtained by the information obtaining step and the event data obtained by the event data obtaining step.

According to an aspect of the present disclosure, there is provided a non-transitory computer-readable storage medium storing a program, the program that causes a computer to perform processing on a printer including a print head that discharges ink, the processing including: functioning as a learning section configured to perform machine learning on a prediction condition of an occurrence interval of the ink discharge failures in accordance with a learning data set created based on a combination of the parameter that affects ink discharge failures of the printer and the event data regarding the occurrence state of the ink discharge failures.

DESCRIPTION OF EXEMPLARY EMBODIMENTS

In the following, a description will be given of embodiments for carrying out the present disclosure with reference to the accompanying drawings. In this regard, in the embodiments described below, various limitations are imposed as best-suited specific examples of the present disclosure. However, the scope of the present disclosure is not limited to these examples. The scope of the present disclosure will not be limited to these modes unless mentioned as limited in particular in the following description.

1. First Embodiment 1.1 Printer Configuration

Figure 1:
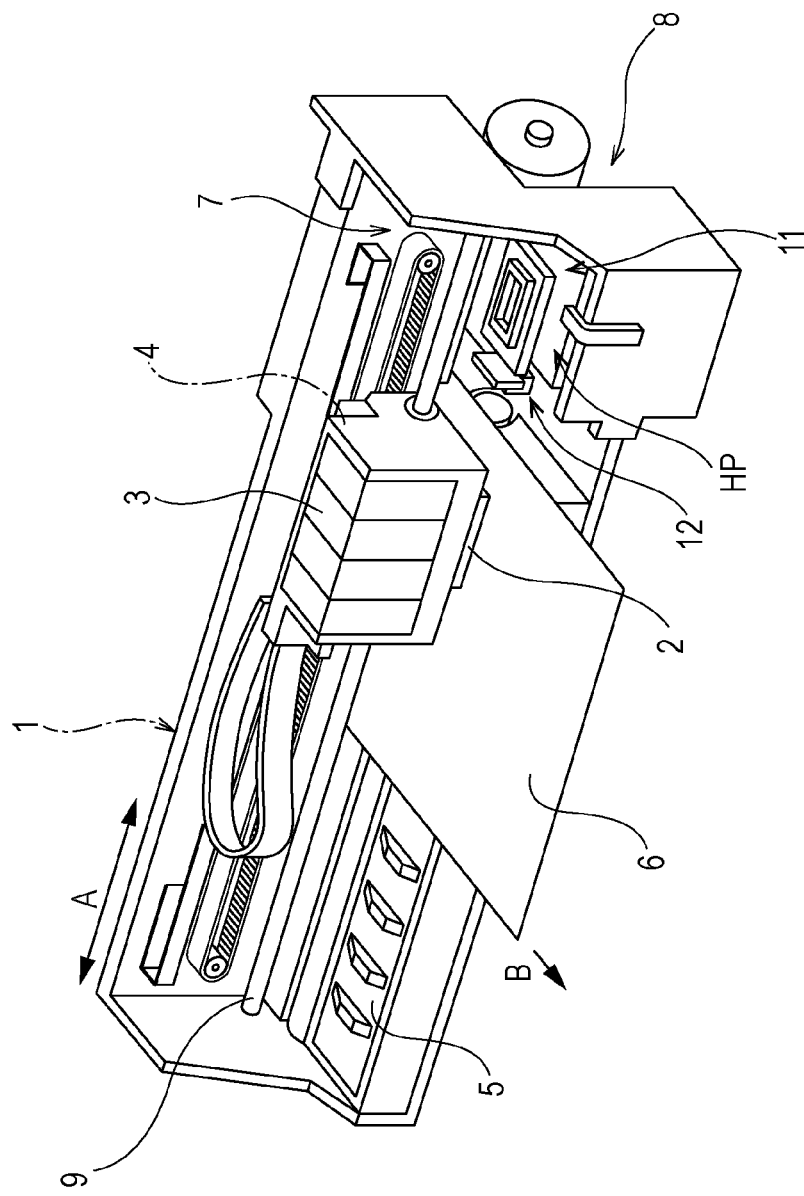
FIG. 1 is a perspective view of a printer according to a first embodiment.

FIG. 1 is a perspective view of the configuration of a printer 1. The printer 1 is an ink-jet recording apparatus that includes a print head 2 for discharging ink and forms an image by discharging ink on paper 6. The paper 6 is an example of a recording medium. The printer 1 may have a configuration that uses rolled paper or continuous paper as a recording medium in addition to the paper 6, which is cut paper. The printer 1 includes a carriage 4, on which a print head 2 and an ink cartridge 3 containing ink are mounted, and a platen 5 disposed opposite to the print head 2.

The printer 1 includes a carriage movement mechanism 7 that reciprocates the carriage 4 in a main scanning direction A and a transport mechanism 8 that moves the paper 6 in a transport direction B. The transport direction B in which the paper 6 is transported is a direction intersecting the main scanning direction A of the carriage 4 and is said to be a sub-scanning direction, which is perpendicular to the main scanning direction A in the example in FIG. 1. The transport mechanism 8 includes, for example, a transport roller that moves the paper 6 by sandwiching the paper 6, a transport motor that operates a transport roller, and a wheel train mechanism that transmits power of the transport motor to the transport roller.

The printer 1 includes a cap movement mechanism 11 and a wiper movement mechanism 12 in the range in which the print head 2 scans by the movement of the carriage 4. More specifically, the cap movement mechanism 11 and the wiper movement mechanism 12 are disposed at a home position HP at the end of the scanning range of the print head 2. The home position HP is located at the position separated from the paper 6 in the scanning range of the print head 2. The cap movement mechanism 11 includes, for example, a cap that covers a nozzle opened at the print head 2, a link mechanism that moves the cap to a position in contact with the print head 2 and to a position away from the contact position, and an actuator that drives a link mechanism to move the cap, and the like. The wiper movement mechanism 12 includes, for example, a wiper that wipes the surface on the print head 2 where a nozzle opening is located, a link mechanism that moves the wiper to the position in contact with the print head 2 and to the position away from the contact position, and an actuator that drives the link mechanism to move the wiper, and the like.

At the home position HP, various maintenance operations of the print head 2, such as cleaning, nozzle check, flushing, and the like are performed in addition to the operations of the cap movement mechanism 11 and the wiper movement mechanism 12.

The carriage 4 is attached in a rotatably supported manner to a carriage guide shaft 9 that is disposed in a hanging manner in the main scanning direction. The carriage movement mechanism 7 includes, for example, an endless belt that moves the carriage 4 along the carriage guide shaft 9, a pulley on which the endless belt is stretched, and a motor that drives the endless belt in the forward direction and the backward direction.

Figure 2:
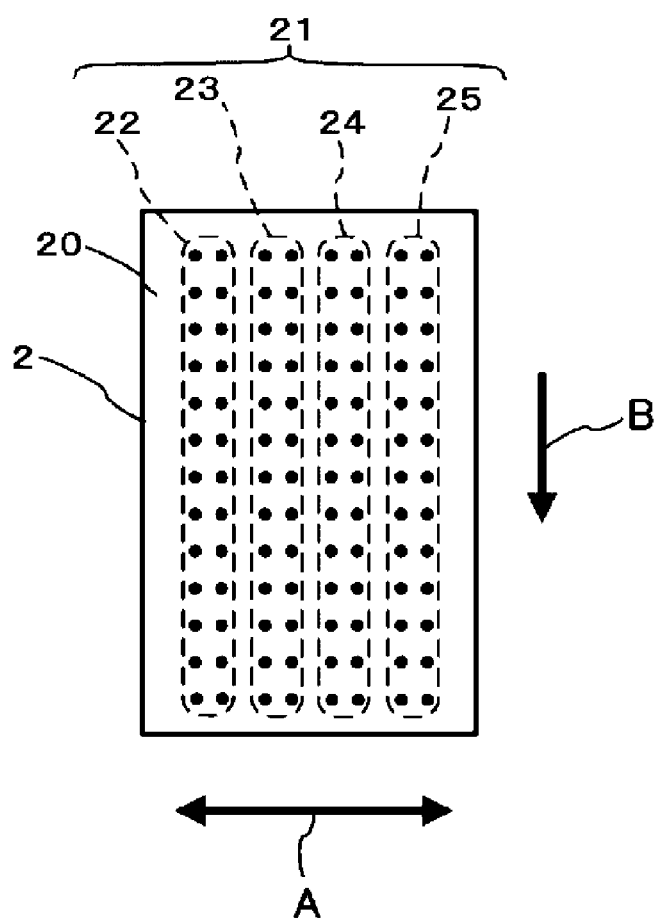
FIG. 2 is a plan view of a print head.

FIG. 2 is a plan view of the print head 2 and illustrates a nozzle face 20 on which nozzle openings are formed. The nozzle face 20 is provided with a nozzle section 21. The nozzle section 21 includes a plurality of nozzles having respective openings on the nozzle face 20. The individual nozzles have respective openings so as to form nozzle columns 22, 23, 24, and 25. The individual nozzle columns 22, 23, 24, and 25 are arranged in the main scanning direction A.

The printer 1 allows each of the nozzle columns 22, 23, 24, and 25 to discharge different color ink with one another. For example, the nozzle column 22 is assigned to black (K) ink, the nozzle column 23 is assigned to yellow (Y) ink, the nozzle column 24 is assigned to magenta (M) ink, and the nozzle column 25 is assigned to cyan (C) ink.

Figure 3:
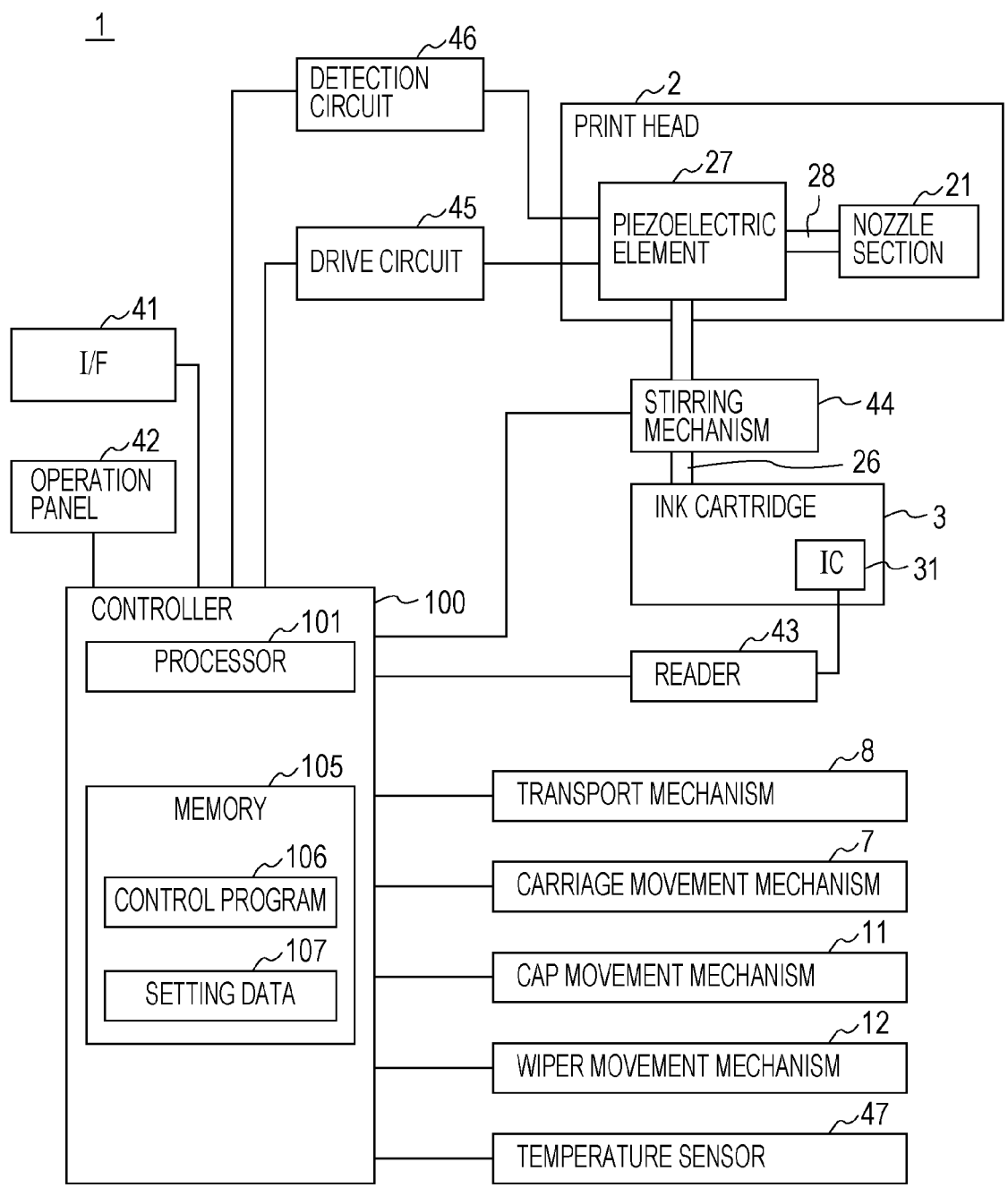
FIG. 3 is a block diagram of the printer.

FIG. 3 is a block diagram of the printer 1. The printer 1 includes a controller 100 that controls each section of the printer 1. The controller 100 includes a processor 101 that executes a program, and a memory 105. The processor 101 is an operation processing device that includes a CPU (central processing unit), a DSP (digital signal processor), a microcomputer, or the like. Also, the processor 101 may include a plurality of pieces of hardware or may include a single processor. Also, the processor 101 may be hardware including programs that have the functions of individual sections described later. That is to say, the processor 101 may have a configuration in which the control program 106 is realized as a hardware circuit. In this case, for example, the processor 101 includes an ASIC (application specific integrated circuit) or an FPGA (field programmable gate array). In the following description, a description will be given of an example of the configuration in which the processor 101 executes the control program 106 so as to realize various functions of the controller 100.

The memory 105 has a storage area that stores a program executed by the processor 101 and data processed by the processor 101. The memory 105 stores the control program 106 executed by the processor 101 and setting data 107 including various setting values regarding the operation of the printer 1. The memory 105 has a nonvolatile storage area that stores a program and data in a nonvolatile manner. Also, the memory 105 may have a volatile storage area to provide a work area that temporarily stores a program to be executed by the processor 101 and data to be processed by the processor 101.

The printer 1 includes the print head 2 described above and a drive circuit 45 that operates the print head 2. The print head 2 includes a piezoelectric element 27. The piezoelectric element 27 is coupled to the ink cartridge 3 mounted on the carriage 4 via an ink flow path 26 and has an ink flow path 28 that supplies ink to the nozzle section 21. The piezoelectric element 27 is disposed for each nozzle included in the nozzle section 21 and has an ink flow path 28 coupled to each nozzle.

The drive circuit 45 is coupled to the controller 100 and performs the operation of the piezoelectric element 27 under the control of the controller 100. The piezoelectric element 27 pumps ink supplied from the ink cartridge 3 to a nozzle in the nozzle section 21 through the ink flow path 26 by a pulse current supplied from the drive circuit 45 and causes the nozzle to discharge ink.

For example, a carriage movement mechanism 7, a transport mechanism 8, a cap movement mechanism 11, and a wiper movement mechanism 12 are coupled to the controller 100. The carriage movement mechanism 7 moves the carriage 4 in the main scanning direction A under the control of the controller 100, and the transport mechanism 8 transports the paper 6 under the control of the controller 100. The controller 100 causes the carriage movement mechanism 7 to move the print head 2 in the main scanning direction A, causes the drive circuit 45 to discharge ink from the print head 2, and causes the transport mechanism 8 to transport the paper 6 so as to perform printing.

The cap movement mechanism 11 moves the cap under the control of controller 100 and attaches or detaches the cap to or from the nozzle face 20. The wiper movement mechanism 12 moves the wiper under the control of controller 100. The controller 100 causes the carriage movement mechanism 7 to move the print head 2 to the home position HP and causes the cap movement mechanism 11 to attach the cap to the nozzle face 20. When the controller 100 performs printing, the controller 100 causes the cap movement mechanism 11 to detach the cap from the nozzle face 20 and causes the carriage movement mechanism 7 to move the print head 2. Also, when the controller 100 performs wiping of the nozzle face 20, the controller 100 causes the wiper movement mechanism 12 to raise the wiper and causes the carriage movement mechanism 7 to move the print head 2 so as to wipe the nozzle face 20.

A reader 43 is coupled to the controller 100. The reader 43 reads data from an IC (integrated circuit) 31 attached on the ink cartridge 3. The IC 31 is an IC chip that has a storage area for storing data, for example, a contact-type IC chip. However, the IC 31 may be a noncontact-type IC chip or a wireless IC tag. The reader 43 reads data from the IC 31 of the ink cartridge 3 mounted on the carriage 4 and outputs the read data to the controller 100. The reader 43 may have a function of writing data on the IC 31. The reader 43 may be a device capable of reading data from the IC 31, for example, a contact-type IC reader/writer. The IC 31 stores information indicating a color of the ink cartridge 3, information indicating a production time of the ink cartridge 3, a serial number of the ink cartridge 3, information indicating the amount of ink contained in the ink cartridge 3, and the like. Also, the IC 31 may have a configuration that includes a data writable storage area by the reader 43. In this case, the reader 43 writes information indicating the date and time of initial filling of ink read from the ink cartridge 3, for example. The date and time of initial filling of ink refers to the date and time when the ink cartridge 3 was opened and set to the printer 1.

Also, the printer 1 may include a stirring mechanism 44. The stirring mechanism 44 is a device that is disposed in an ink flow path 26 that supplies ink from the ink cartridge 3 to the print head 2 and that stirs ink in the ink flow path 26. The stirring mechanism 44 may have a configuration in which, for example, a circulation path for circulating ink in a loop is disposed in a part of the ink flow path 26, and a pumping mechanism is disposed that causes ink to flow in the circulation path. The stirring mechanism 44 stirs ink in the ink flow path 26 in order to prevent, suppress, or dissolve sediments of particles and solid components included in ink.

The printer 1 includes an interface 41. The interface 41 is a coupling section coupled to a host computer that controls the printer 1. The interface 41 decodes a signal input from the host computer to generate input data and outputs the data to the controller 100. The interface 41 codes data input from the controller 100 and outputs the data to the host computer. The interface 41 includes, for example, a connector connectable to a cable and an interface circuit that inputs and outputs a signal via the connector. The interface 41 may also be a wireless communication interface. In this case, the interface 41 includes, for example, an antenna, a baseband circuit, a coding/decoding circuit, and the like.

The printer 1 includes an operation panel 42. The operation panel 42 includes a power switch for turning on/off the power to the printer 1, and operation elements for performing various operations, such as setting the printer 1, and the like. The operation panel 42 also includes an LED (light emitting diode) indicator and notifies of the operation state of the printer 1 by lighting or blinking the LED indicator.

The printer 1 may include a temperature sensor 47. The temperature sensor 47 is a sensor disposed to detect the temperature of the environment in which the printer 1 is installed and, for example, a thermistor is used. The temperature sensor 47 is coupled to the controller 100 and detects the temperature under the control of the controller 100 to obtain a detection value. The controller 100 is capable of detecting the temperature of the installation environment of the printer 1. The temperature sensor 47 may be located at any position and, for example, the temperature sensor may be mounted on the substrate on which the processor 101 is implemented. Alternatively, the temperature sensor may be disposed at the home position HP or at the position of the platen 5. The temperature sensor 47 may also be implemented on the substrate that is mounted on the print head 2.

The printer 1 includes a detection circuit 46. The detection circuit 46 is coupled to the controller 100 and the piezoelectric element 27, and detects an electronic signal output from the piezoelectric element 27, which is caused by the vibration of the piezoelectric element 27 under the control of the controller 100. The controller 100 is capable of detecting whether a discharge failure occurs or not with each of the nozzles of the nozzle section 21 using the detection circuit 46.

A discharge failure of the print head 2 refers to clogging of a nozzle of the nozzle section 21. However, the discharge failure may include a deviation of the impact position on the paper 6 of ink discharged from a nozzle, an increase or a decrease of the ink amount discharged from a nozzle that is larger or smaller beyond the permissible range in addition to this. The cause of a discharge failure includes an increase in the viscosity of ink, adhesion of a foreign object to the ink opening section, mixing an air bubble in the nozzle section 21 and the ink flow path 28, sedimentation of ink components in the ink flow paths 26 and 28, and the like. The foreign objects include, for example, dried ink in the opening section of a nozzle, ink not impacted on the paper 6 and adhered to the nozzle face 20 after having been discharged, and paper powder produced from the paper 6. For example, when the print head 2 discharges a minimum ink droplet at print time, the ink droplet is sometimes flowed by air flow caused by the movement of the carriage 4 and adhered to the nozzle face 20. Accordingly, a foreign object is sometimes adhered to the nozzle face 20 when the print head 2 forms a minimum-sized dot. An increase in the viscosity of ink refers to a phenomenon in which the viscosity of ink increases due to volatilization of an ink component in the nozzle opening section.

When the controller 100 causes the print head 2 to discharge ink, the controller 100 causes the drive circuit 45 to select the piezoelectric element 27 coupled to the target nozzle and to apply an ejection drive pulse to the piezoelectric element 27 so as to operate the piezoelectric element 27. When the drive circuit 45 applies one ejection drive pulse in the driving period of the piezoelectric element 27, the nozzle discharges an ink droplet. When the droplet is impacted on the paper 6, a small-sized dot is formed on the paper 6. Also, when the drive circuit 45 applies two ejection drive pulses in the driving period of the piezoelectric element 27, the nozzle discharges an ink droplet twice. These droplets are impacted on the substantially same position on the paper 6 to form a large-sized dot on the paper 6. In this manner, it is possible for the controller 100 to individually select a nozzle of the nozzle section 21, to form a dot on a desired position of the paper 6, and to control the size of a formed dot.

Further, the controller 100 may cause the drive circuit 45 to apply a minimum ejection drive pulse for discharging a minimum-sized ink droplet to the piezoelectric element 27. In this case, the nozzle of the print head 2 discharges an ink droplet smaller than the ink droplet described above, and a minimum-sized dot is formed on the paper 6.

When the controller 100 detects a discharge failure of a nozzle, the controller 100 causes the drive circuit 45 to apply an inspection drive pulse to the piezoelectric element 27 so as not to discharge ink from the print head 2. Since the inspection drive pulse has a drive voltage lower than the ejection drive pulse and the minimum ejection drive pulse, the displacement of the piezoelectric element 27 when the inspection drive pulse is applied is smaller than the displacement in the case of applying the ejection drive pulse. Accordingly, when the inspection drive pulse is applied, the piezoelectric element 27 is displaced such that ink is not discharged from a nozzle.

When the piezoelectric element 27 is displaced by applying a pulse, a counter electromotive force arises on a line electrically coupled to the piezoelectric element 27 due to the residual vibration of the piezoelectric element 27. More specifically, when the piezoelectric element 27 is displaced, a pressure is imposed on the ink in the nozzle section 21, and a pressure vibration occurs in the ink. The pressure vibration in the ink causes damped vibration or residual vibration of the piezoelectric element 27, and thereby a counter electromotive force arises in the piezoelectric element 27 due to the residual vibration. The state of the residual vibration of the piezoelectric element 27 changes depending on the state of the nozzle in the nozzle section 21. Specifically, if a nozzle clogging, an increase in the viscosity of ink in a nozzle, mixing an air bubble in the ink flow path 28 and a nozzle, or the like occurs, a change arises in the amplitude, the period, the phase, and the like of the residual vibration of the piezoelectric element 27. Thereby, by analyzing the amplitude, the period, the phase, and the like of the waveform of a counter electromotive force that occurs in the piezoelectric element 27, it is possible to determine the state of the nozzle.

The detection circuit 46 detects the waveform of the counter electromotive force that has occurred in the piezoelectric element 27 and outputs the detection result to the controller 100. The controller 100 analyzes the detection result of the detection circuit 46 so as to detect or determine the occurrence state of a discharge failure in a nozzle.

When the drive circuit 45 applies an ejection pulse to the piezoelectric element 27, the controller 100 detects a counter electromotive force of the piezoelectric element 27 by the detection circuit 46, and thereby it is possible for the controller 100 to detect or determine the state of a discharge failure of a nozzle. Accordingly, it is possible for the controller 100 to detect the occurrence of a discharge failure both for a nozzle that has discharged ink and for a nozzle that has not discharged ink in the nozzle section 21.

1.2 Configuration of Printer Controller

Figure 4:
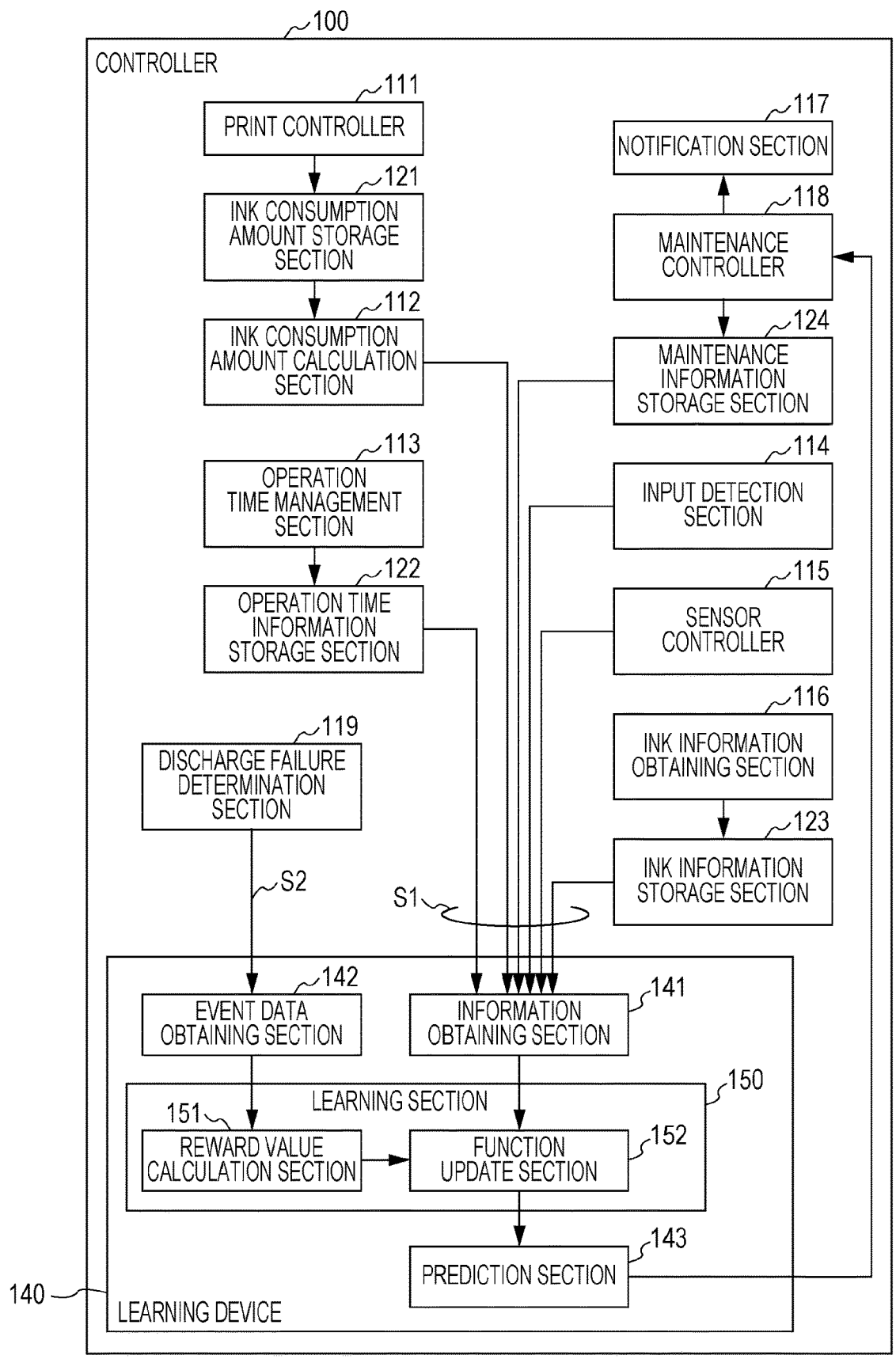
FIG. 4 is a functional block diagram of a controller of the printer.

FIG. 4 is a functional block diagram of the controller 100. Each component illustrated in FIG. 4 includes a functional section that is realized by the processor 101 executing the control program 106 and a memory formed by using a storage area of the memory 105 under the control of the processor 101.

The controller 100 includes a print controller 111, an ink consumption amount calculation section 112, an operation time management section 113, an input detection section 114, a sensor controller 115, an ink information obtaining section 116, a notification section 117, a maintenance controller 118, and a discharge failure determination section 119. Also, the controller 100 includes a learning device 140. As described above, each of these sections is realized, for example, by the processor 101 executing the control program 106 in a combination of software and hardware.

The controller 100 includes an ink consumption amount storage section 121, an operation time information storage section 122, an ink information storage section 123, and a maintenance information storage section 124. These are virtual memories formed in the storage area of the memory 105 by the processing of the processor 101.

The learning device 140 includes an information obtaining section 141 that obtains a parameter S1 affecting ink discharge failures of the print head 2 from each section of the printer 1 and an event data obtaining section 142 that obtains the event data regarding the occurrence state of the ink discharge failures. The learning device 140 includes a learning section 150 that learns a prediction condition regarding the prediction of the occurrence interval of ink discharge failures in accordance with the learning data set created based on a combination of the parameter S1 and event data S2.

The information obtaining section 141 obtains, as the parameter S1, at least any one of the color of ink used by the print head 2, the ink consumption amount of each color ink in the occurrence interval of ink discharge failures, the temperature of the use environment of the printer 1, the maintenance information indicating the execution state of the maintenance operation of the print head 2, the operation time information regarding the operation time of the printer 1, and the ink information of the ink used by the print head 2.

The learning device 140 includes a prediction section 143 that predicts the occurrence interval of ink discharge failures based on the event data obtained by the event data obtaining section 142 and the prediction condition learned by the learning section 150.

The print controller 111 controls the drive circuit 45, the carriage movement mechanism 7, and the transport mechanism 8 to perform printing on the paper 6. When the print controller 111 causes the print head 2 to discharge ink, the print controller 111 stores the ink amount discharged for each color in the ink consumption amount storage section 121 as an ink consumption amount. The print controller 111 calculates an ink consumption amount, for example, by the number of ejection drive pulses output from the drive circuit 45.

The ink consumption amount storage section 121 stores the ink amount discharged from the print head 2 for each ink color. The ink consumption amount storage section 121 may store the number of times of discharging a minimum-sized ink droplet by the print head 2. In this case, the print controller 111 may store the number of minimum ejection drive pulses in the ink consumption amount storage section 121 separately from the number of ejection drive pulses.

The ink consumption amount calculation section 112 calculates the ink consumption amount in a specified period based on the ink consumption amount for each ink color stored in the ink consumption amount storage section 121. The ink consumption amount calculation section 112 calculates the ink consumption amount, for example, at a period set in advance after the point in time when the ink consumption amount was calculated last time. In this case, the ink consumption amount calculation section 112 calculates the ink consumption amount in the set period for each set period.

The operation time management section 113 monitors the operation state of the printer 1 for each set time and counts the operation time when the printer 1 is in operation. The operation time management section 113 stores the operation time of the printer 1 in the operation time information storage section 122, and when the operation time information storage section 122 stores the operation time, the operation time management section 113 adds the stored operation time. The operation time management section 113 may have a configuration capable of performing an RTC (real time clock) function that keeps the current time or may store the time when the operation state of the printer 1 changes in the operation time information storage section 122.

The input detection section 114 detects input by the interface 41 and the operation panel 42. For example, when an instruction to clean the print head 2 has been input by the operation of the operation panel 42, the input detection section 114 detects this input. The sensor controller 115 performs temperature detection by the temperature sensor 47.

The ink information obtaining section 116 reads information recorded on the IC 31 by the reader 43 and stores the read information in the ink information memory 123. The ink information memory 123 stores the information read by the ink information obtaining section 116 from the IC 31. The information stored in the ink information memory 123 includes, for example, information indicating the color of the ink in the ink cartridge 3, information indicating the production time of the ink cartridge 3, a serial number of the ink cartridge 3, information indicating the amount of ink in the ink cartridge 3, information indicating the date and time of the initial filling of the ink, and the like. The ink information memory 123 stores each piece of information in association with, for example, a serial number of the ink cartridge. Also, the ink information obtaining section 116 may delete information regarding an ink cartridge 3 that was removed from the carriage 4 from the ink information memory 123 out of the ink cartridges 3 mounted on the carriage 4.

The discharge failure determination section 119 determines whether or not a discharge failure has occurred in the print head 2. The discharge failure determination section 119 performs at least either of an autonomous determination function that automatically detects and determines a discharge failure using the drive circuit 45 and the detection circuit 46, or a manual determination function that detects and determines a discharge failure based on input by a user of the printer 1.

When the autonomous determination function is performed, the discharge failure determination section 119 causes the drive circuit 45 to apply an inspection drive pulse to the piezoelectric element 27 and causes the detection circuit 46 to detect a counter electromotive force of the piezoelectric element 27 so as to determine whether or not a discharge failure has occurred for each nozzle. The discharge failure determination section 119 may also determine whether or not a discharge failure has occurred when printing is performed on the paper 6. In this case, when the drive circuit 45 applies an ejection drive pulse or a minimum ejection drive pulse to the piezoelectric element 27 under the control of the print controller 111, the discharge failure determination section 119 detects a counter electromotive force of the piezoelectric element 27 using the detection circuit 46 and determines whether or not a discharge failure has occurred.

The discharge failure determination section 119 may also determine whether or not a discharge failure has occurred by discharging ink from the nozzle section 21 at the home position HP as the autonomous determination function. In this case, the discharge failure determination section 119 selects one or a plurality of nozzles from the nozzles of the nozzle section 21 and causes the drive circuit 45 to apply an ejection drive pulse to the piezoelectric element 27 coupled to the selected nozzles. The discharge failure determination section 119 detects a change in the electrostatic capacitance of the cap of the cap movement mechanism 11 so as to detect that ink discharged from the nozzle has impacted on the cap. Here, when no change has occurred in the electrostatic capacitance of the cap, there is a high possibility that ink has not impacted and that a discharge failure has occurred. Also, when a change in the electrostatic capacitance of the cap is smaller than an expected change, there is a possibility that the ink amount discharged from the nozzle is small and that a discharge failure has occurred. By performing this operation for all the nozzles or a part of the nozzles of the nozzle section 21, it is possible for the discharge failure determination section 119 to determine whether or not a discharge failure has occurred.

A method of using a camera is given as another autonomous determination function. This method is possible when the printer 1 has a configuration in which a camera is mounted on the print head 2. In this configuration, for example, it is possible for the controller 100 to obtain a captured image by the camera. In this mode, the discharge failure determination section 119 causes the print controller 111 to print a nozzle check pattern on the paper 6, and the pattern printed on the paper 6 is captured by the camera. The discharge failure determination section 119 detects the pattern from the captured image of the camera, compares the shape of the pattern, the thickness of line, and the like with those of reference data so as to determine whether or not there is a printing failure portion, such as a not-printed portion, a portion having too thin ink color, a portion having excessive ink adhered, and the like.

When a manual determination function is performed, the discharge failure determination section 119 is caused to print the nozzle check pattern on the paper 6 under the control of the print controller 111. The user views a pattern printed on the paper 6 and visually checks whether there are printing failure portions in the pattern, such as a not-printed portion, a portion having too thin ink color, a portion having excessive ink adhered, and the like. The user inputs whether or not there is a printing failure portion by the operation on the operation panel 42. Here, the user ought to be prompted to input whether or not there is a printing failure portion for each ink color. The contents of input by the user operation on the operation panel 42 are obtained by the discharge failure determination section 119.

The maintenance controller 118 determines a maintenance execution timing based on the occurrence interval of discharge failures predicted by the prediction section 143. The maintenance execution timing determined by the maintenance controller 118 has the effects of preventing, suppressing, resolving, or relieving ink discharge failures of the print head 2.

The notification section 117 notifies of the execution timing of the maintenance determined by the maintenance controller 118. The notification section 117, for example, causes the LED indicator on the operation panel 42 to blink. The notification section 117 may also perform processing for notifying a host computer connected to the interface 41 of the maintenance timing or may perform processing for printing the maintenance timing on the paper 6.

The maintenance controller 118 performs the maintenance of the print head 2 in accordance with the maintenance execution timing. The maintenance of the print head 2 includes a plurality of types of operation. Specifically, the maintenance of the print head 2 includes flushing, cleaning, and wiping. The flushing is an operation to discharge ink from each of nozzles of the ink nozzle section 21 in a state in which the carriage 4 is moved to the home position HP. The flushing has an effect of removing thickened ink by discharging ink stored in the opening section of the nozzle. The cleaning is an operation to mount the cap on the nozzle face 20 by the cap movement mechanism 11 and to suck ink from the nozzle by the cap movement mechanism 11. The cleaning has an expected effect of removing foreign objects and air bubbles from the nozzle by compulsorily circulating ink in the nozzle. The cleaning also enables thickened ink to be removed. The wiping is an operation to wipe the nozzle face 20 by the wiper movement mechanism 12 and has an effect of removing foreign objects on the nozzle face 20 and adjusting the meniscus of the opening section of the nozzle.

The maintenance controller 118 controls each section of the printer 1 to perform at least any one of the flushing, the cleaning, and the wiping. The maintenance controller 118 stores the information indicating the type of the performed maintenance and the time or the timing of the performed maintenance in the maintenance information storage section 124. The maintenance information storage section 124 stores the information input from the maintenance controller 118 as maintenance information that indicates history of the maintenance performed by the maintenance controller 118.

1.3 Learning Device

Figure 5:
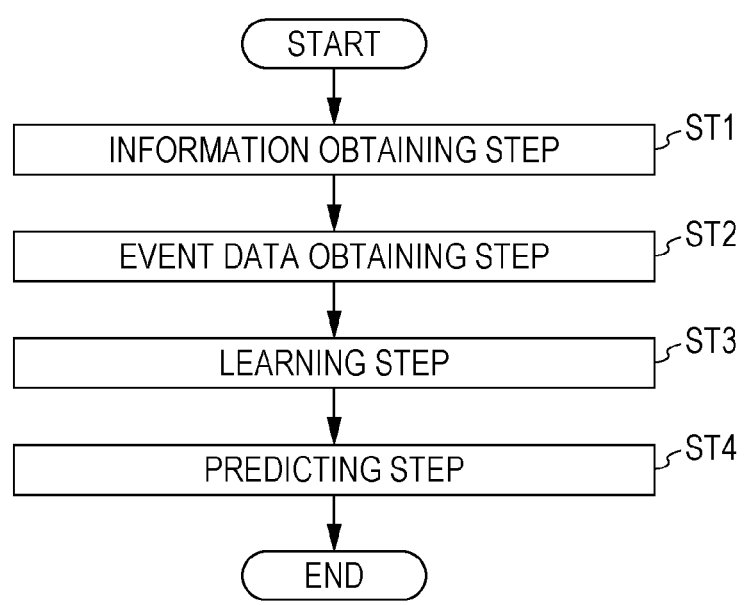
FIG. 5 is a flowchart illustrating an overview of the operation of a learning device.

Here, a description will be given of an overview of the learning device 140. FIG. 5 is a flowchart illustrating the overview of the operation of a learning device 140. The learning device 140 executes an information obtaining step (step ST1) and obtains a parameter S1 from each section of the printer 1 by the information obtaining section 141.

The parameter S1 is a parameter that affects ink discharge failures of the print head 2. The parameter S1 includes at least any one of the color of the ink used by the print head 2, the consumption amount of each color ink in the occurrence interval of ink discharge failures, the temperature of the use environment of the printer 1, the maintenance information indicating the execution state of the maintenance operation of the print head 2, the operation time information regarding the operation time of the printer 1, and ink information regarding the ink used by the print head 2.

The color of the ink used by the print head 2 and the ink information regarding the ink used by the print head 2 are included in the ink information stored in the ink information memory 123. The consumption amount of each color ink in the occurrence interval of ink discharge failure is included in the ink consumption amount calculated by the ink consumption amount calculation section 112. The temperature of the use environment of the printer 1 is a detection value of the temperature sensor 47 detected by the sensor controller 115. The maintenance information indicating the execution state of the maintenance operation of the print head 2 is the maintenance information stored by the maintenance information storage section 124. The operation time information regarding the operation time of the printer 1 is the operation time stored by the operation time information storage section 122. The parameter S1 may also include data regarding input detected by the input detection section 114. The information obtaining section 141 may obtain the ink information from the ink information obtaining section 116. The information obtaining section 141 may obtain the maintenance information from the maintenance controller 118.

The learning device 140 executes event data obtaining step (step ST2) and obtains event data S2 by the event data obtaining section 142. The event data S2 is data regarding the occurrence state of ink discharge failures and is data indicating the determination result by the discharge failure determination section 119. For example, the event data S2 includes data indicating whether or not a discharge failure has occurred and the time when a discharge failure has occurred. The event data obtaining section 142 obtains a determination result from the discharge failure determination section 119. In this regard, the discharge failure determination section 119 may store the determination result in the memory 105 as the event data S2, and the event data obtaining section 142 may obtain the event data S2 stored in the memory 105.

The learning device 140 executes a learning step (step ST3) by the learning section 150 and learns the prediction condition regarding the prediction of the occurrence interval of ink discharge failures in accordance with a learning data set created based on a combination of the parameter S1 and the event data S2.

The learning device 140 executes the predicting step (step ST4) and predicts the occurrence interval of ink discharge failures by the prediction section 143 based on the event data obtained by the event data obtaining section 142 and the prediction condition learnt by the learning section 150.

The learning device 140 repeatedly executes the operation of steps ST1 to ST4 while the power to the printer 1 is on.

A learning algorithm used by the learning section 150 is not limited in particular. In the present embodiment, a description will be given of an example in which reinforcement learning is employed. As a representative method of the reinforcement learning, TD learning and Q-learning are given. For example, in the case of Q-learning, a general update expression (action value table) of an action value function Q(s, a) is expressed by the following expression 1.

$$Q(s_t, a_t) = E_{s_{t+1}} + 1(r_{t+1} + \gamma E_{a_{t+1}}(Q(S_{t+1}, a_{t+1}))) \quad (1)$$

In the expression 1, $s_t$ denotes an environment at time t, and $a_t$ denotes action at time t. By performing the action $a_t$, the environment changes to $s_{t+1}$. The term $r_{t+1}$ denotes a reward given by the change of the environment, γ denotes a discount rate, and α denotes a learning coefficient. When Q-learning is applied to the learning section 150, the action at corresponds to a period in which an ink discharge failure of the print head 2 occurs, that is to say, an occurrence interval of discharge failures.

The reward value calculation section 151 calculates a reward based on the occurrence interval of discharge failures determined by the prediction section 143 and the actual occurrence timing of discharge failures obtained from the event data S2. The function update section 152 updates the function for calculating the occurrence interval of discharge failures based on the parameter S1 obtained by the information obtaining section 141 and the reward calculated by the reward value calculation section 151. For example, in the case of Q-learning, the action value function Q(s, a) expressed by the expression 1 is used as a function for changing the occurrence interval of discharge failures, which is the action at.

1.4 Printer Operation

Figure 6:
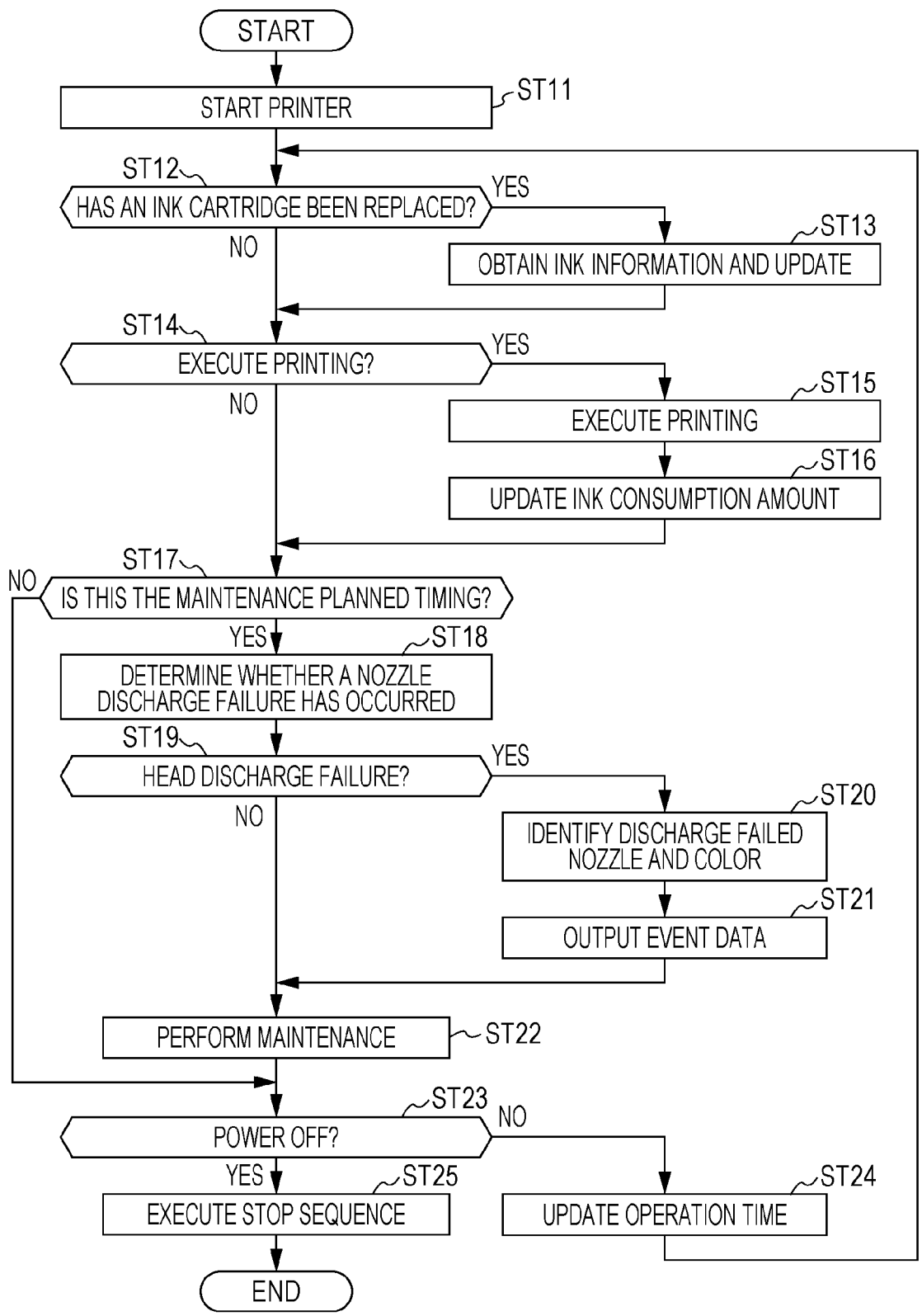
FIG. 6 is a flowchart illustrating the operation of the printer.

Next, a description will be given of the operation of the printer 1. FIG. 6 is a flowchart illustrating the operation of the printer 1. When the printer 1 is started (step ST11), the controller 100 determine whether or not the ink cartridge 3 mounted on the carriage 4 has been replaced (step ST12). The controller 100 reads information, for example, from the IC 31 by the reader 43 and compares the read information with the ink information stored in the ink information memory 123 so as to determine whether or not an ink cartridge 3 has been replaced.

When determined that the ink cartridge 3 has been replaced (step ST12; YES), the controller 100 updates the ink information stored in the ink information memory 123 with the information read by the reader 43 from the IC 31 (step ST13). After that, the processing of the controller 100 proceeds to step ST14. When determined that the ink cartridge 3 has not been replaced (step ST12; NO), the controller 100 does not perform the operation of step ST13, and the processing proceeds to step ST14.

In step ST14, the controller 100 determines whether or not to perform printing on the paper 6 (step ST14). When printing is to be performed (step ST14; YES), the print controller 111 executes printing (step ST15). Further, the print controller 111 updates the ink consumption amount stored in the ink consumption amount storage section 121 in accordance with the consumption of the ink associated with printing (step ST16). In step ST16, the print controller 111 causes the ink consumption amount storage section 121 to store the ink consumption amount for each ink color. Also, when the operation time information storage section 122 stores the minimum-sized ink droplet in the number of times of discharging, the print controller 111 updates the number of times of discharging minimum-sized ink droplets in step ST16. After that, the processing of the controller 100 proceeds to step ST17. When printing is not to be performed (step ST14; NO), the processing of the controller 100 proceeds to step ST17 without performing the operations of step ST15 and ST16.

In step ST17, the controller 100 determines whether or not the timing has come to perform maintenance by the maintenance controller 118 (step ST17). When the timing has come to perform maintenance (step ST17; YES), the controller 100 causes the discharge failure determination section 119 to determine whether or not a discharge failure has occurred (step ST18). In step ST18, the discharge failure determination section 119 determines whether or not a discharge failure of each nozzle of the print head 2 has occurred, for example, by the above-described autonomous determination function or manual determination function.

The discharge failure determination section 119 determines whether or not a discharge failure of the print head 2 has occurred based on the determination result of each nozzle in step ST18 (step ST19). When a discharge failure of the print head 2 has occurred, the discharge failure determination section 119 determines affirmatively. In step ST19, if the number of nozzles, which is higher than a threshold value set in advance, is determined to have a discharge failure in step ST18, the discharge failure determination section 119 determines affirmatively. For example, if the threshold value is set to "0", when one or more nozzles are determined to have a discharge failure in step ST18, the discharge failure determination section 119 determines affirmatively in step ST19. The threshold value may be set to any number and ought to be suitably determined in accordance with the specification of the printer 1.

Also, the discharge failure determination section 119 may determine whether or not a discharge failure has occurred for each ink color in step ST19. In this case, the discharge failure determination section 119 determines whether or not a discharge failure has occurred for each ink color based on the determination result of each nozzle in step ST18. Here, the threshold value for determining a discharge failure of the print head 2 may be set for each ink color or may use a threshold value common to each ink color.

The color of ink used for an ink jet color printer includes a so-called special color ink in addition to the four colors of C, M, Y, and K. A white color ink used for a special color ink often includes a white color pigment and has a characteristic in which sedimentary pigments are likely to be produced. Accordingly, a discharge failure is likely to occur in the nozzle that discharges white color ink out of the nozzles of the print head 2. Also, in consideration of the applications of white color ink, compared with other color ink, a discharge failure of white color ink hardly affects the print quality. Accordingly, it is possible for the discharge failure determination section 119 to determine a discharge failure of the nozzle that discharges white color ink using a threshold value higher than that of the other colors.

Further, in step ST19, the discharge failure determination section 119 may make a determination based on the disposition of a nozzle determined to have a discharge failure in step ST18. For example, when the nozzles determined to have a discharge failure in step ST18 are disposed consecutively, the discharge failure determination section 119 may determine that a discharge failure has occurred in the print head 2. In this case, the discharge failure determination section 119 may apply a threshold value to the number of nozzles determined to have a discharge failure, which are disposed consecutively. Further, the discharge failure determination section 119 may use consecutive disposition of the nozzles as a determination criterion of a discharge failure for a specific ink color and may apply a different threshold value for each ink color.

As an example, when the number of nozzles that discharges ink of C, M, Y, and K among the nozzles determined to have a discharge failure in step ST18 is larger than a first threshold value, the discharge failure determination section 119 determines that a discharge failure has occurred in the print head 2. Also, when the nozzles that discharge white color ink are located consecutively, and the number of the nozzles disposed consecutively is larger than a second threshold value among the nozzles determined to have a discharge failure in step ST18, the discharge failure determination section 119 determines that a discharge failure has occurred in the print head 2.

When a discharge failure has occurred in the print head 2 (step ST19; YES), the discharge failure determination section 119 identifies the number of nozzles having a discharge failure and the ink color (step ST20) and outputs the event data S2 (step ST21). The event data S2 output by the discharge failure determination section 119 is obtained from the event data obtaining section 142. After that, the processing of the controller 100 proceeds to step ST22. When determined that a discharge failure has not occurred in the print head 2 (step ST19; NO), the processing of the controller 100 proceeds to step ST22 without performing the operations of step ST20 and ST21.

In step ST22, the maintenance controller 118 performs the set maintenance, such as flushing, cleaning, or the like (step ST22). After performing the maintenance operation, the controller 100 determines whether or not the power to the printer 1 is to be turned off (step ST23). For example, when the input detection section 114 detects the operation of the power switch on the operation panel 42, the controller 100 determines to turn off the power to the printer 1 (step ST23; YES). In this case, the controller 100 executes a stop sequence for stopping the printer 1 (step ST25) to turn off the power to the printer 1.

When the power to the printer 1 is not to be turned off (step ST23; NO), the controller 100 causes the operation time management section 113 to update the operation time stored in the operation time information storage section 122 (step ST24), and the processing returns to step ST12.

Also, when the controller 100 determine that the timing has not come to perform the maintenance by the maintenance controller 118 (step ST17; NO), the controller 100 does not perform the operations of step ST18 to ST22, and the processing proceeds to step ST23.

Figure 7:
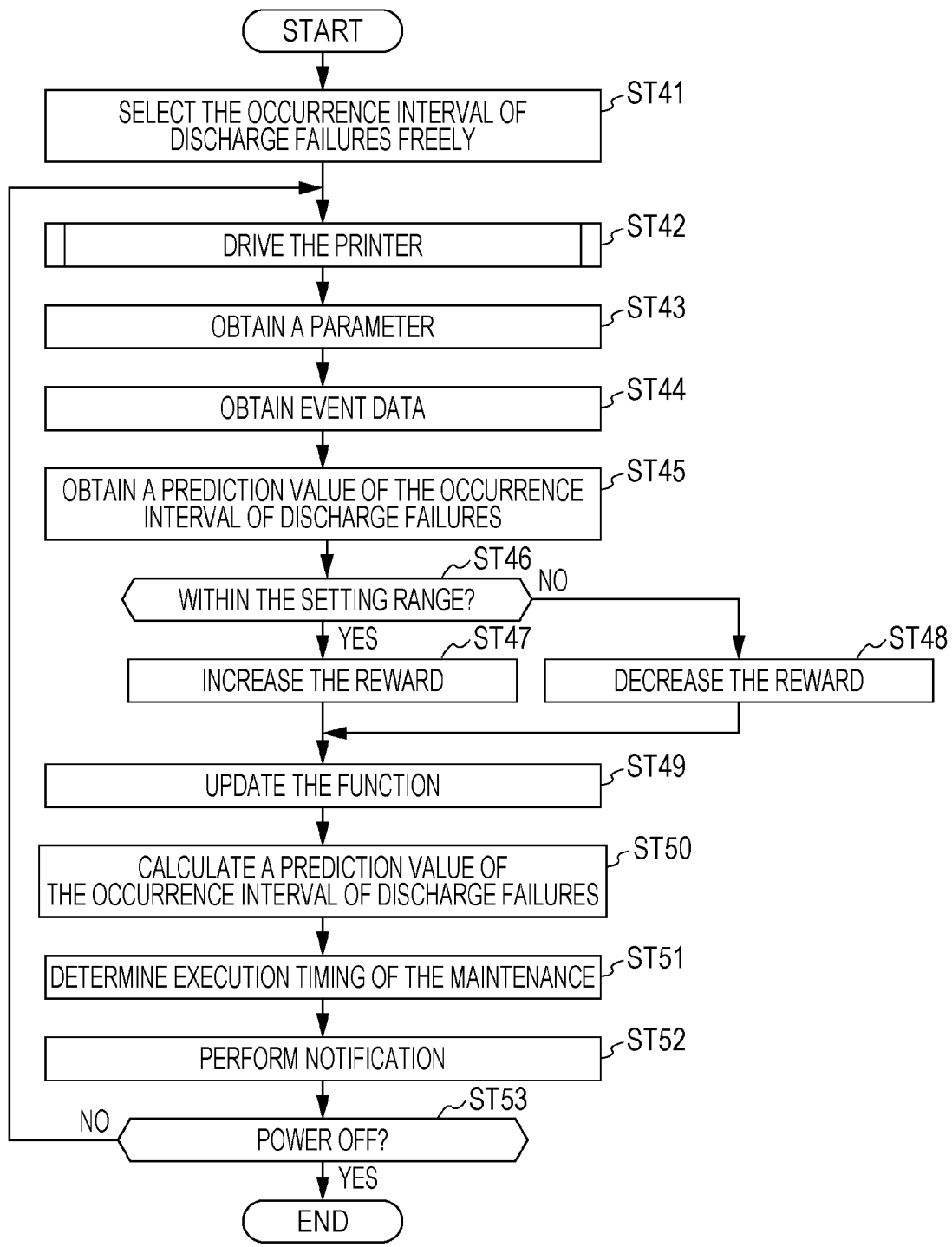
FIG. 7 is a flowchart illustrating the operation of the printer.

FIG. 7 is a flowchart illustrating the operation of the printer 1. In particular, FIG. 7 illustrates the operation on the learning by the learning device 140. The learning device 140 selects the occurrence interval of discharge failures of the print head 2 freely, that is to say, randomly as an initial value of reinforcement learning (step ST41). Here, the controller 100 controls the printer 1 to perform operation (step ST42). The operation of step ST42 is, for example, the operation illustrated in FIG. 6. In step ST42, as described with reference to FIG. 6, the parameter S1, such as the ink information, the ink consumption amount, the operation time, and the like and the event data S2 are updated or output.

The learning device 140 obtains the parameter S1 that indicates the state of the operation of the printer 1 executed in step ST42 by using the information obtaining section 141 (step ST43). Further, the learning device 140 obtains the event data S2 by the event data obtaining section 142 (step ST44). The parameter S1 obtained by the information obtaining section 141 becomes a variable learnt by the learning section 150. Also, a combination of the parameter S1 and the event data S2 correspond to a learning data set for the learning section 150 to perform reinforcement learning.

The event data obtaining section 142 obtains the prediction value of the occurrence interval of discharge failures (step ST45). The prediction value obtained in step ST45 is a value selected freely in the case of an initial value, and is a prediction value calculated in step ST50 in the case of not an initial value. In this regard, the processing in step ST44 and step ST45 may be performed in the reverse order.

The event data obtaining section 142 compares the event data S2 obtained in step ST44 and the prediction value obtained in step ST45 and determines whether or not the ratio of the difference between the values falls within a specified range a (step ST46). The difference between the values is the absolute value of the difference between the actual occurrence interval of discharge failures indicated by the event data S2 and the "predicted occurrence interval of discharge failures", which is the prediction value of the occurrence interval of discharge failures and is the left side of the following expression (2). The event data obtaining section 142 determines whether or not the following expression (2) holds in step ST46.

$$\frac{\left|\begin{pmatrix} \text{PREDICTED OCCURRENCE} \\ \text{INTERVAL OF DISCHARGE} \\ \text{FAILURES} \end{pmatrix} - \begin{pmatrix} \text{ACTUAL OCCURRENCE} \\ \text{INTERVAL OF} \\ \text{DISCHARGE FAILURES} \end{pmatrix}\right|}{\text{ACTUAL OCCURRENCE INTERVAL OF DISCHARGE FAILURES}} < \text{SPECIFIED RANGE } \alpha \qquad (2)$$

When the above-described expression (2) holds (step ST46; YES), the reward value calculation section 151 increases the reward (step ST47). On the other hand, when the above-described expression (2) does not hold (step ST46; NO), the reward value calculation section 151 decreases the reward (step ST48). A specific method for calculating the reward by the reward value calculation section 151 is not limited in particular. Any method may be applied as long as the reward given when the expression (2) holds is higher than the reward given when the expression does not hold. For example, a predetermined value may be added to a specified reward in step ST47, and a specified value may be subtracted from the specified reward in step ST48. Also, the reward may be calculated in different methods with each other in step ST47 and ST48. The reward value calculation section 151 also may have a plurality of setting values, may give a high setting value as the reward in step ST47, and may give a low setting value as the reward in step ST48.

Next, the function update section 152 updates the function for predicting the occurrence interval of discharge failures of the print head 2 based on the reward increased in step ST47 or decreased in step ST48 (step ST49).

The prediction section 143 predicts the occurrence interval of discharge failures of the print head 2 based on the function updated in step ST49 and calculates a prediction value that gives the highest reward (step ST50). The prediction value determined by the prediction section 143 is output to the maintenance control section 118. The maintenance controller 118 determines a maintenance timing so as to correspond to the prediction value predicted by the prediction section 143, stores the maintenance timing in the maintenance information memory 124, and outputs the maintenance timing in the notification section 117 (step ST51). The notification section 117 notifies of the maintenance timing determined by the maintenance controller 118 (step ST52).

The learning device 140 determines whether or not the power to the printer 1 is to be turned off (step ST53). The determination of step ST53 is made, for example, in the same manner as the determination of step ST23 in FIG. 6. When the power to the printer 1 is not to be turned off (step ST53; NO), the processing of the learning device 140 returns to step ST42. Thereby, the learning device 140 continuously performs machine learning and learns the prediction of the occurrence interval of discharge failures of the print head 2. When the power to the printer 1 is not to be turned off (step ST53; YES), the learning device 140 terminates this processing.

The description has been given that the learning device 140 is a device that learns and predicts the occurrence interval of discharge failures of the print head 2. However, the learning device 140 may learn and predict the occurrence interval of discharge failures of the print head 2 for each ink color. The operation of the learning device 140 in this case is illustrated in FIG. 8.

Figure 8:
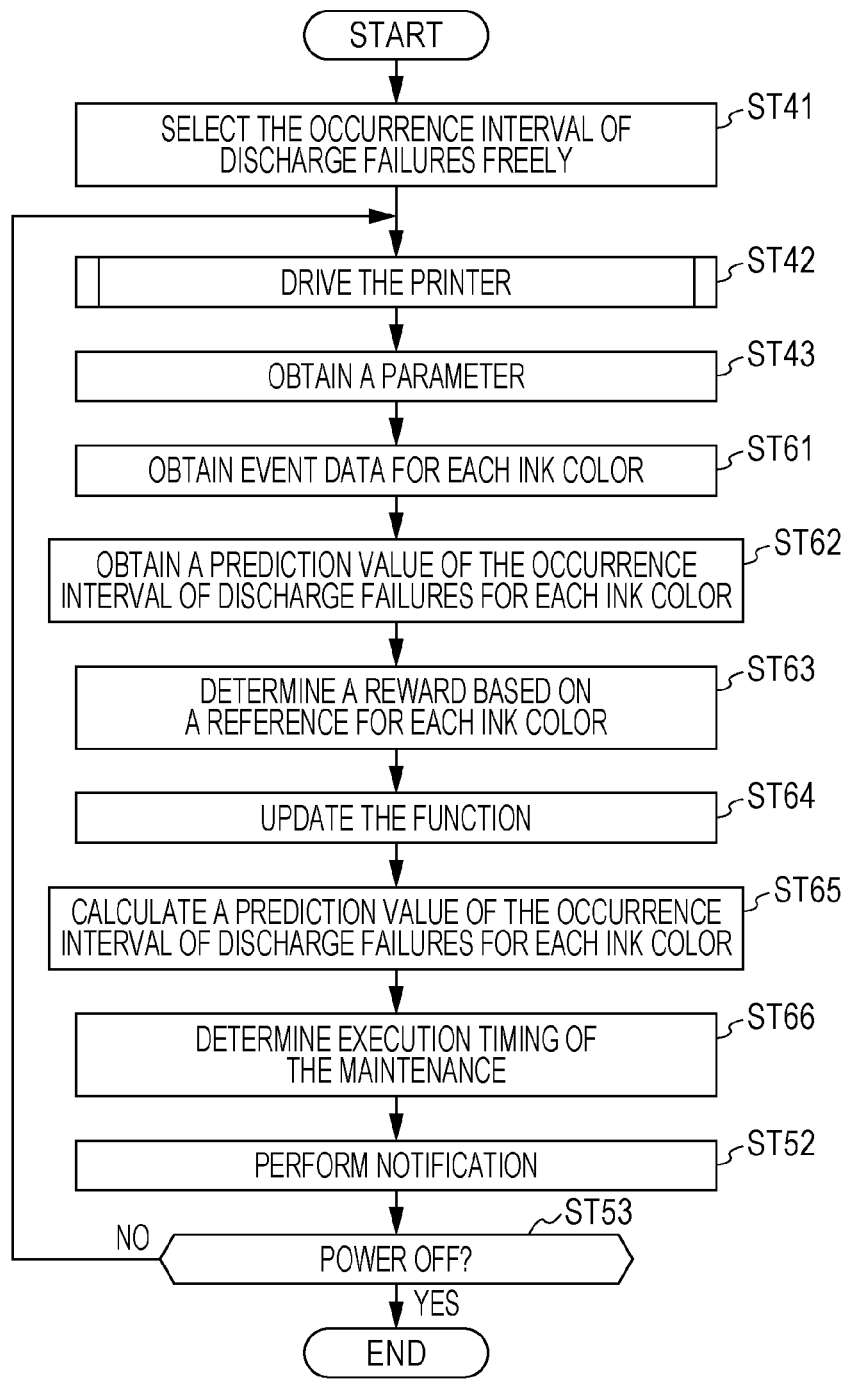
FIG. 8 is a flowchart illustrating the operation of the printer.

FIG. 8 is a flowchart that illustrates the operation of the printer 1 and particularly illustrates the operation regarding the learning by the learning device 140. FIG. 8 illustrates an operation example in which the learning device 140 predicts the occurrence interval of discharge failures for each ink color in the operation illustrated in FIG. 7. The processing in common with the processing in FIG. 7 is given the same step number as that in FIG. 7 and the description thereof will be omitted.

The operation in FIG. 8 is applicable when the discharge failure determination section 119 determines whether or not a discharge failure has occurred for each ink color. That is to say, the discharge failure determination section 119 determines a discharge failure of each nozzle of the print head 2 in step ST18 in FIG. 6, and determines whether or not a discharge failure has occurred for each ink color of the print head 2 in step ST19 based on the determination result. The event data S2 output by the discharge failure determination section 119 includes data indicating whether or not a discharge failure has occurred and the time when the discharge failure has occurred for each ink color used in the print head 2.

After the event data obtaining section 142 obtains the parameter S1 in step ST43, the event data obtaining section 142 obtains event data S2 including the occurrence interval of discharge failures for each ink color (step ST61). The event data obtaining section 142 obtains a prediction value of the occurrence interval of discharge failures for each ink color (step ST62). The prediction value obtained in step ST52 is a value that has been selected freely when the value is an initial value, and is a prediction value calculated in step ST65 described later when the value is not an initial value. In this regard, the processing of step ST61 and step ST62 may be performed in the reverse order.

The reward value calculation section 151 performs the processing for comparing the event data S2 obtained by the event data obtaining section 142 in step ST61 and the prediction value obtained in step ST62 for each ink color and determining a reward for the prediction value (step ST63). The processing of step ST63 corresponds to, for example, the processing for performing the operations of step ST46, ST47, and ST48 in FIG. 7 for each ink color. Specifically, the reward value calculation section 151 selects a target ink color and determines whether or not the expression (2) described above holds for the prediction value of the occurrence interval of discharge failures and the actual occurrence interval of discharge failures that is obtained from the event data S2 for the selected ink color. When the expression (2) holds, the reward value calculation section 151 increases the reward for the target ink color, whereas when the expression (2) does not hold, the reward value calculation section 151 decreases the reward for the target ink color. The reward value calculation section 151 performs this processing for all the ink colors discharged from the print head 2.

The function update section 152 updates the function for predicting the occurrence interval of discharge failures of the print head 2 based on the reward determined by the reward value calculation section 151 (step ST64).

The prediction section 143 predicts the occurrence interval of discharge failures of the print head 2, from which a highest reward is obtained for each ink color based on the function updated in step ST64 and outputs the prediction value (step ST65). The prediction value is output to the maintenance controller 118. The maintenance controller 118 determines a maintenance timing so as to correspond to the prediction value predicted by the prediction section 143, stores the maintenance timing in the maintenance information storage section 124, and outputs the maintenance timing in the notification section 117 (step ST66). The notification section 117 performs the operation of notifying the maintenance timing determined by the maintenance controller 118 (step ST52).

In step ST66, the maintenance controller 118 determines the maintenance timing corresponding to a maintenance type and the prediction value of the occurrence interval of discharge failures for each ink color. For example, the maintenance controller 118 determines the execution timing of cleaning and wiping in accordance with the shortest prediction value among the prediction values of the occurrence interval of discharge failures of each ink color. The maintenance controller 118 may also weight to the prediction value of the occurrence interval of discharge failures for each ink color and may perform calculation processing on the weighted prediction value so as to determine the maintenance timing. For example, the maintenance controller 118 may perform weighting such that a weight to the occurrence interval of discharge failures of the white color ink becomes less than the weights to the occurrence intervals of discharge failures of the other ink colors.

Also, in step ST66, the maintenance controller 118 may determine the maintenance execution timing of the print head 2 for each nozzle or for each nozzle group. Specifically, the maintenance controller 118 may select only a part of nozzles out of the nozzles of the print head 2 and determine a timing of executable maintenance for each ink color based on the prediction value of the occurrence interval of discharge failures of each ink color. The maintenance of this type includes, for example, flushing. In this case, the maintenance controller 118 determines the timing of the maintenance for each of the nozzle columns 22, 23, 24, and 25 corresponding to the individual ink colors. In this case, the maintenance controller 118 determines the timing of the maintenance of the type that is not executable for ink color as described above. Accordingly, the maintenance controller 118 determines the execution timing for each type of the maintenance.

As described above, the printer 1 according to the present embodiment includes the information obtaining section 141 that obtains the parameter S1 affecting an ink discharge failure of the print head 2 that discharges ink. The printer 1 includes the event data obtaining section 142 that obtains the event data S2 regarding the occurrence state of ink discharge failures. The printer 1 includes the learning section 150 that performs machine learning on the prediction condition regarding the prediction of the occurrence interval of ink discharge failures by using a learning data set created based on the combination of the parameter S1 obtained by the information obtaining section 141 and the event data S2 obtained by the event data obtaining section 142.

The learning device 140 includes the information obtaining section 141 that obtains the parameter S1 affecting the ink discharge failure of the print head 2 for the printer 1 including the print head 2. The learning device 140 includes the event data obtaining section 142 that obtains the event data S2 regarding the occurrence state of ink discharge failures. The learning device 140 includes the learning section 150 that performs machine learning on the prediction condition regarding the occurrence interval of ink discharge failures by using a learning data set created based on the combination of the parameter S1 obtained by the information obtaining section 141 and the event data S2 obtained by the event data obtaining section 142.

A learning method performed by the learning device 140 includes an information obtaining step (step ST1) for obtaining the parameter S1 that affects an ink discharge failure of the print head 2 for the printer 1 including the print head 2. The learning method also includes an event data obtaining step (step ST2) for obtaining the event data S2 regarding the occurrence state of ink discharge failures. The learning method also includes a learning step (step ST3) for performing machine learning on the prediction condition of the occurrence interval of ink discharge failures by using a learning data set created based on a combination of the parameter S1 obtained by the information obtaining step and the event data S2 obtained by the event data obtaining step. It is possible for the learning device 140 to configure as a program executable by a computer for performing the processing on the printer 1.

In this manner, the learning device 140 performs learning on the prediction of the occurrence interval of the discharge failures using the parameter S1 obtained by actually operating the printer 1 and the event data S2 indicating the actual occurrence interval of discharge failures. Accordingly, it becomes possible to correctly predict the occurrence interval of discharge failures in accordance with the actual use state. Thereby, it becomes possible to handle a discharge failure by suitably predicting the occurrence timing of discharge failures of the print head 2. For example, it is possible to suitably determine the execution timing of maintenance for suppressing or reducing discharge failures of the printer 1. Accordingly, it becomes possible for the printer 1 to suppress excessive execution of maintenance, to perform necessary maintenance, to suppress ink consumption involved with maintenance, and to effectively suppress deterioration in print quality and the occurrence of printing failures.

The printer 1 includes the prediction section 143 that predicts the occurrence interval of ink discharge failures based on the event data S2 and the prediction condition. By performing learning using the parameter S1 obtained by actually operating the printer 1 and the event data S2 indicating the actual occurrence interval of discharge failures, it is possible to predict the occurrence interval of discharge failure of the print head 2 with high precision.

The learning section 150 includes the reward value calculation section 151 that compares the occurrence interval of ink discharge failures predicted based on the prediction condition and the event data S2 obtained by the event data obtaining section 142 and determines a reward. The learning section 150 also performs reinforcement learning based on the reward determined by the reward value calculation section 151. More specifically, the learning section 150 includes the information obtaining section 141 that updates the prediction condition in accordance with the reward calculated by the reward value calculation section 151. Accordingly, it is possible to perform reinforcement learning in which the function learnt by the learning section 150 is evaluated by the reward and updated, and to predict the occurrence interval of ink discharge failures with high precision.

The event data obtaining section 142 obtains the event data S2 regarding the actual occurrence of ink discharge failures of the print head 2. The reward value calculation section 151 determines a reward based on the difference between the occurrence interval ink discharge failures determined based on the prediction condition and the actual occurrence interval of discharge failures indicated by the event data S2. Accordingly, in the reinforcement learning, in which the learning section 150 evaluates the learnt function by the reward and updates the function, it is possible to perform learning with high precision by determining the reward promptly and suitably.

The printer 1 includes the maintenance controller 118 that determines the maintenance execution timing based on the occurrence interval of ink discharge failures predicted by the prediction section 143. By the maintenance controller 118, it is possible to suitably determine the timing to perform maintenance based on the prediction value of the occurrence interval of discharge failures of the print head 2.

The printer 1 has the print head 2, and the maintenance controller 118 perform maintenance of the print head 2 in accordance with the maintenance execution timing. Thereby, it is possible to effectively suppress or prevent the occurrence of discharge failures of the print head 2.

The printer 1 includes the notification section 117 that notifies of the maintenance execution timing. By the notification section 117, it is possible to notify the user and another computer of performing the maintenance based on prediction value of the occurrence interval of discharge failures of the print head 2 and the execution timing.

The parameter S1 obtained by the information obtaining section 141 included in the learning device 140 may include the color of ink used by the print head 2. The parameter S1 may also include the consumption amount of each color ink in the occurrence interval of ink discharge failures. The parameter S1 may also include temperature of the use environment of the printer 1. The parameter S1 may also include the maintenance information indicating the execution state of the maintenance operation of the print head 2. The parameter S1 may also include the operation time information regarding the operation time of the printer 1. The parameter S1 may also include the ink information on the ink used by the print head 2. Since the information obtaining section 141 obtains at least one of the pieces of the information described above as the parameter S1, it is possible to use the information based on the actual operation of the printer 1 for the learning performed by the learning section 150. Accordingly, it is possible to perform more effective learning and to predict the occurrence interval of discharge failures with high precision by reflecting the use environment and the use state of the printer 1.

Also, the print head 2 includes a plurality of nozzles, each of which is assigned to a corresponding one of the ink colors.

The prediction section 143 predicts the occurrence interval of ink discharge failures for each nozzle or for each nozzle group including a plurality of nozzles. The maintenance controller 118 determines the maintenance execution timing of for each nozzle or for each nozzle group based on the occurrence interval of ink discharge failures, which is predicted by the prediction section 143. With this configuration, when the occurrence interval of discharge failures is predicted for each ink color, it is possible to perform maintenance of a part of nozzles of the print head 2 in accordance with the prediction value of each color. Accordingly, it is possible to perform maintenance more efficiently.

2. Second Embodiment

Figure 9:
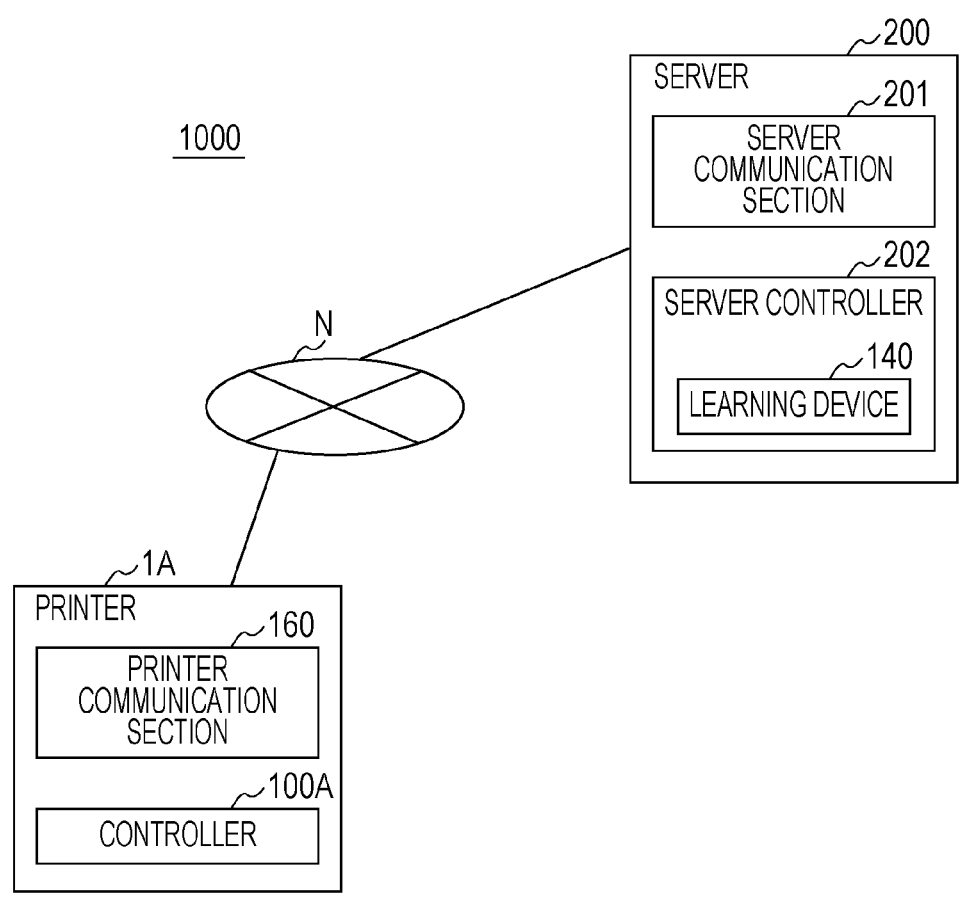
FIG. 9 is a schematic configuration diagram of an information processing system according to a second embodiment.

FIG. 9 is a schematic configuration diagram of an information processing system 1000 according to a second embodiment. In the information processing system 1000, a printer 1A configured in the same manner as the printer 1 and a server 200 are connected with each other via a communication network N in a communication enabled manner. The printer 1A includes a controller 100A that controls the printer 1A and a printer communication section 160 that transmits and receives data to and from the server 200 under the control of the controller 100A.

The server 200 includes a server communication section 201 that performs data communication via the communication network N and a server controller 202 that controls the server 200 including the server communication section 201. The server controller 202 includes a learning device 140.

In the first embodiment, a description has been given of the configuration in which the learning device 140 mounted on the printer 1 performs learning based on the parameter S1 and the event data S2, which are obtained by the actual operation of the printer 1. In the second embodiment, a description will be given of an example of the configuration of the information processing system 1000 in which the learning device 140 included in the server 200 performs learning based on the parameter S1 and the event data S2, which are obtained by the actual operation of the printer 1A. In the description of the second embodiment, a component configured in the same manner as that of the printer 1 according to the first embodiment is given the same reference sign as that of the first embodiment, and the description thereof is omitted.

The printer communication section 160 and the server communication section 201 are communication devices that perform data communication via the communication network N. The printer communication section 160 and the server communication section 201 may include respective wired communication interfaces that perform data communication via a cable or wireless communication interfaces. For example, well-known various standards may be used for the specific specification and the supporting protocol of the printer communication section 160 and the server communication section 201. Also, the communication network N may include a dedicated line, a public line network, and a mobile communication network, or may be a network installed in a specific area or building.

The printer 1A has the configuration common to the printer 1 illustrated in FIG. 3 with the exception of including the controller 100A instead of the controller 100. The controller 100A includes the processor 101 and the memory 105 in the same manner as the controller 100 and executes the program by the processor 101 to control each section of the printer 1A.

Figure 10:
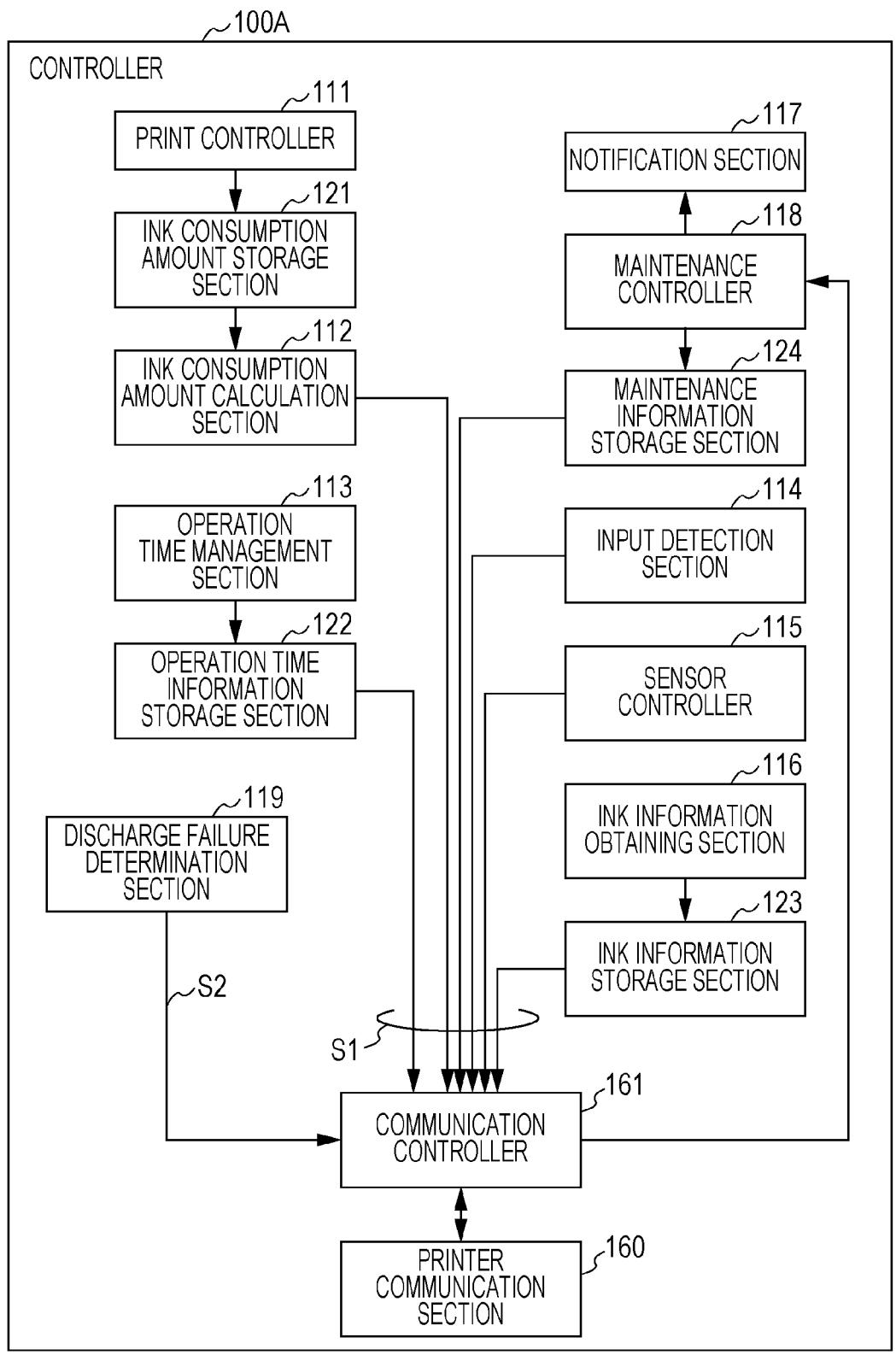
FIG. 10 is a functional block diagram of a controller of the printer.

FIG. 10 is a functional block diagram of the controller 100A. The controller 100A includes a communication controller 161. The communication controller 161 obtains information from the ink consumption amount calculation section 112, the input detection section 114, the sensor controller 115, the operation time information memory 122, the ink information memory 123, and the maintenance information storage section 124. That is to say, the communication controller 161 obtains the parameter S1. The communication controller 161 also obtains the event data S2 output by the discharge failure determination section 119. The communication controller 161 controls the printer communication section 160 to transfer data with the server 200. Also, when the printer communication section 160 receives data including a predication value from the server 200, the communication controller 161 outputs the prediction value to the maintenance controller 118.

Figure 11:
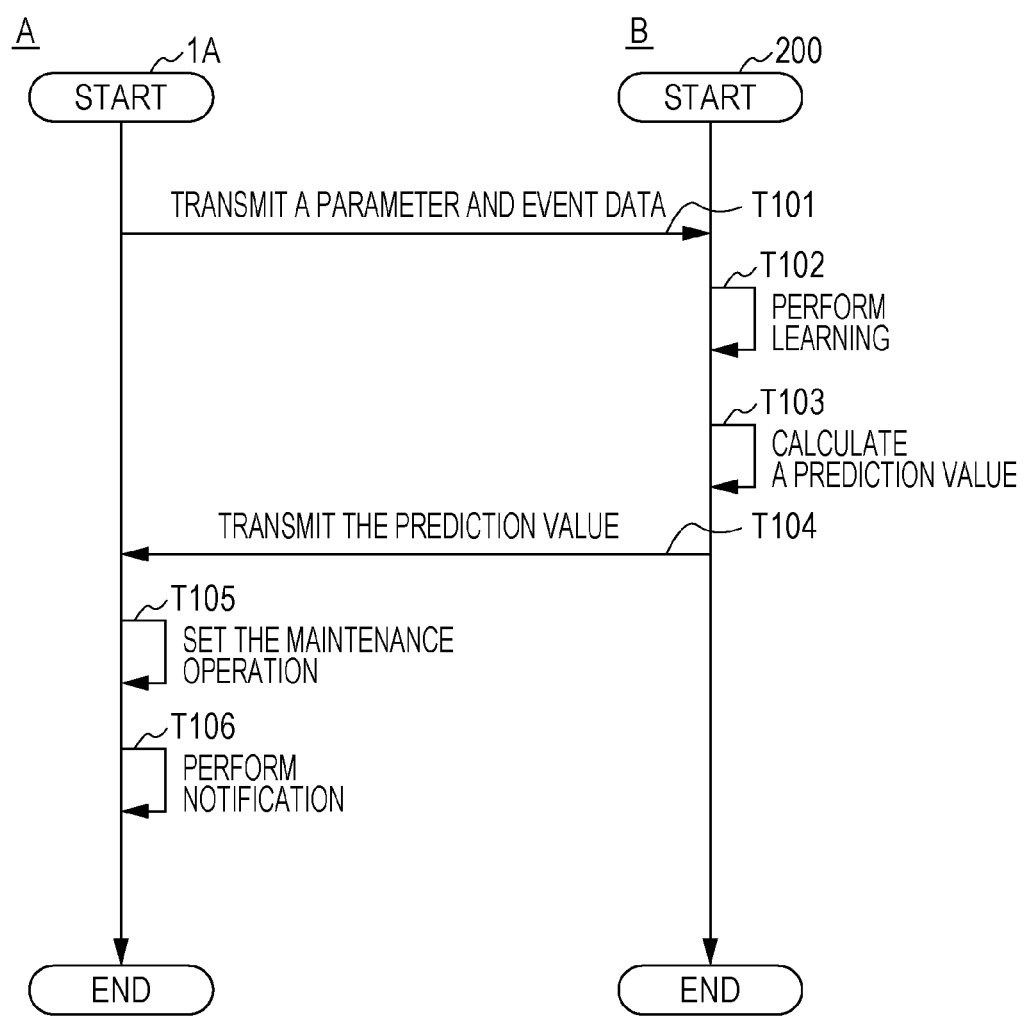
FIG. 11 is a sequence diagram illustrating the operation of the information processing system.

FIG. 11 is a sequence diagram illustrating the operation of the information processing system 1000. In FIG. 11, a reference sign A denotes the operation of the printer 1A, and a reference sign B denotes the operation of the server 200.

In the printer 1A, the communication controller 161 controls the printer communication section 160 so as to transmit the parameter S1 and the event data S2 to the server 200 (step ST101). The printer 1A may separately transmit the parameter S1 and the event data S2.

The server controller 202 of the server 200 receives the parameter S1 and the event data S2 by the server communication section 201. The server controller 202 inputs the received parameter S1 and event data S22 to the learning device 140, and the learning device 140 performs learning (step ST102). In step ST102, the learning device 140 performs the operation described with reference to FIG. 7 and FIG. 8 and performs learning based on the learning data set including the parameter S1 and the event data S2, which are obtained from the printer 1.

The learning device 140 predicts the occurrence interval of discharge failures of the nozzles of the print head 2 of the printer 1 by the prediction section 143 and calculates a prediction value (step ST103). The server controller 202 controls the server communication section 201 so as to transmit the prediction value calculated in step ST104 to the printer 1A (step ST104).

When the communication controller 161 receives a prediction value by the printer communication section 160, the communication controller 161 outputs the prediction value to the maintenance controller 118. The maintenance controller 118 determines maintenance timing in accordance with the prediction value (step ST105). The maintenance controller 118 outputs the determined timing to the notification section 117, and the notification section 117 performs notification operation for notifying of the maintenance timing determined by the maintenance controller 118 (step ST106). The operations of steps ST105 and ST106 ought to be the same as those of steps ST51 and ST52 in FIG. 7.

In the information processing system 1000 according to the second embodiment, the server 200 includes the learning device 140, and the learning device 140 performs learning for predicting the occurrence interval of discharge failures based on the parameter S1 and the event data S2, which are obtained in association with the operation of the printer 1A. Accordingly, it is possible for a device different from the printer 1A to predict the occurrence interval of discharge failures of the printer 1A with high precision.

The server 200 may also be configured to communicate with a plurality of printers 1A, and the learning device 140 may learn the parameter S1 and the event data S2 that are obtained by the operations of a plurality of printers 1A. In this case, the learning by the learning device 140 progresses at a high level, and thus it is possible to predict the occurrence interval of discharge failure with higher precision.

In this regard, the learning device 140 according to the second embodiment may be a device, such as a personal computer, a smartphone, a tablet computer, or the like. That is to say, a device, such as a personal computer, a smartphone, a tablet computer, or the like may include the learning device 140, or a device described above may function as the learning device 140. In this case, the communication network N may be a small-scale wireless LAN (local area network), or a wireless or wired communication line that connects the printer 1A and the device described above in a one-to-one relationship.

In the configuration described above, a device such as the computer, or the like, learns the parameter S1 and the event data S2 obtained by the operation of the printer 1A and performs learning on the occurrence interval of discharge failures of the printer 1A in the same manner as the server 200. Also, the computer may function as a so-called local server and the computer may further transmit the learnt result to the server 200, and the server 200 may learn the occurrence interval of discharge failures of the printers 1A under its control.

Further, it is possible to realize the learning device 140 that performs learning in the server 200 in the mode of a program. Accordingly, it is possible to install the learning device 140 that performs learning in the server 200 in another device as a program. For example, it is possible to implement the learning device 140 that performs learning in the server 200 in the printer 1 described in the first embodiment as a program. In this case, it is possible for the printer 1 to predict the occurrence interval of discharge failures using the learning device 140 that has completed learning, and thus to obtain a prediction value with high precision promptly after a start of using the printer 1.

In this regard, the embodiments described above illustrate specific examples to which the present disclosure is applied, and the present disclosure is not limited to these. For example, as long as the printer 1 or 1A is an ink jet printer that discharges ink, it is possible to freely change the type of the color of ink to be used, the number of ink colors, and the mode of the paper 6. For example, the print head 2 is not limited to have a configuration in which the carriage 4 is mounted to perform scanning in the main scanning direction, and the print head 2 may be a line head. Also, continuous paper or rolled paper may be used as the paper 6, and the printer 1 or 1A may include a paper container that contains the paper 6.

Also, the application target of the present disclosure is not limited to a device that is singly used as a printer. For example, the present disclosure may be applied to a device that has a function other than printing, such as a multifunction machine having a copy function and a scanning function, a POS terminal, and the like.

Also, in addition to configuring the learning device 140 and the learning section 150 of the learning device 140 as a program executed by the processor 101 as described above, it is possible to realize the devices by a hardware circuit in which the program is built. Also, the program described above may be transmitted from the server 200 to the printer 1 via a transmission medium.

What is claimed is:

1. A printer comprising:
an information obtaining section configured to obtain a parameter that affects ink discharge failures of a print head that discharges ink;
an event data obtaining section configured to obtain event data regarding an occurrence state of the ink discharge failures;
a learning section configured to perform machine learning on a prediction condition of an occurrence interval of the ink discharge failures in accordance with a learning data set created based on the parameter obtained by the information obtaining section and the event data obtained by the event data obtaining section; and
a prediction section configured to predict the occurrence interval of the ink discharge failures based on the event data and the prediction condition,
wherein the learning section includes a reward value calculation section configured to compare the occurrence interval of the ink discharge failures predicted based on the prediction condition with the event data obtained by the event data obtaining section, and performs reinforcement learning based on a reward determined by the reward value calculation section.

2. The printer according to claim 1, wherein
the event data obtaining section obtains the event data regarding an actual occurrence of the ink discharge failures in the print head, and
the reward value calculation section determines the reward based on a difference between the occurrence interval of the ink discharge failures predicted based on the prediction condition and an actual occurrence interval of the ink discharge failures indicated by the event data.

3. The printer according to claim 1, further comprising a maintenance controller configured to determine a maintenance execution timing based on the occurrence interval of the ink discharge failures predicted by the prediction section.

4. The printer according to claim 3, further comprising the print head, wherein
the maintenance controller performs maintenance of the print head in accordance with the maintenance execution timing.

5. The printer according to claim 3, further comprising a notification section configured to notify of the maintenance execution timing.

6. The printer according to claim 3, wherein
for the print head including a plurality of nozzles per color of the ink, the prediction section predicts the occurrence interval of the ink discharge failure per nozzle or per nozzle group including a plurality of nozzles, and
the maintenance controller determines the maintenance execution timing per the nozzle or per the nozzle group based on the occurrence interval of the ink discharge failures predicted by the prediction section.

7. A learning device targeted for a printer including a printer head that discharges ink, the learning device comprising:
an information obtaining section configured to obtain a parameter that affects ink discharge failures of the print head;
an event data obtaining section configured to obtain event data regarding an occurrence state of the ink discharge failures;
a learning section configured to perform machine learning on a prediction condition of an occurrence interval of the ink discharge failures in accordance with a learning data set created based on the parameter obtained by the information obtaining section and the event data obtained by the event data obtaining section;

a prediction section configured to predict the occurrence interval of the ink discharge failures based on the event data and the prediction condition, wherein the learning section includes a reward value calculation section configured to compare the occurrence interval of the ink discharge failures predicted based on the prediction condition with the event data obtained by the event data obtaining section, and performs reinforcement learning based on a reward determined by the reward value calculation section.

8. The learning device according to claim 7, wherein the information obtaining section obtains as the parameter at least any one of color of the ink used by the print head, a consumption amount of the ink per color during the occurrence interval of the ink discharge failures, temperature at use environment of the printer, maintenance information indicating an execution state of maintenance operation of the print head, operation time information regarding operation time of the printer, and ink information regarding the ink used by the print head.

9. A method of learning, targeted for a printer including a printer head that discharges ink, the method comprising:

an information obtaining step of obtaining a parameter that affects ink discharge failures of the print head;

an event data obtaining step of obtaining event data regarding an occurrence state of the ink discharge failures;

a learning step of performing machine learning on a prediction condition of an occurrence interval of the ink discharge failures in accordance with a learning data set created based on the parameter obtained by the information obtaining step and the event data obtained by the event data obtaining step; and a prediction step of predicting the occurrence interval of the ink discharge failures based on the event data and the prediction condition, wherein the learning step includes a reward value calculation section configured to compare the occurrence interval of the ink discharge failures predicted based on the prediction condition with the event data obtained by the event data obtaining section, and performs reinforcement learning based on a reward determined by the reward value calculation section.

* * * * *